United States Patent [19]

Wagner et al.

[11] Patent Number: 5,414,874
[45] Date of Patent: May 16, 1995

[54] ATTACHMENT MEMBER FOR SPRING OR SPRING-LIKE ELEMENT

[75] Inventors: Robert F. Wagner, Medina; Philip J. Pisczak, Novelty, both of Ohio

[73] Assignee: The Ohio Mattress Company Licensing & Components Group, Cleveland, Ohio

[21] Appl. No.: 221,043

[22] Filed: Mar. 30, 1994

Related U.S. Application Data

[62] Division of Ser. No. 651,583, Feb. 6, 1991, Pat. No. 5,332,202.

[51] Int. Cl.⁶ .................. A47C 23/04; A47C 31/00
[52] U.S. Cl. ............................. 5/263; 5/264.1
[58] Field of Search ............ 5/263, 264.1, 265, 282.1, 5/254

[56] References Cited

U.S. PATENT DOCUMENTS

| | | | |
|---|---|---|---|
| 1,095,712 | 5/1914 | D'Arcy . | |
| 1,192,520 | 7/1916 | Fischmann | 5/477 |
| 1,928,526 | 9/1933 | Fellabaum | 267/35 |
| 2,236,007 | 3/1941 | Oldham | 267/93 |
| 2,503,333 | 4/1950 | Gyles | 5/246 |
| 3,242,512 | 3/1966 | Beckman | 5/476 |
| 3,251,076 | 5/1966 | Burke | 5/476 |
| 3,251,077 | 5/1966 | Beckman | 5/476 |
| 3,262,137 | 7/1966 | Beckman et al. | 5/476 |
| 3,262,138 | 7/1966 | Knittel | 5/476 |
| 3,263,247 | 8/1966 | Knittel et al. | 5/476 |
| 3,276,048 | 10/1966 | Beckman | 5/476 |
| 3,280,410 | 10/1966 | Propst et al. | 5/476 |
| 3,302,220 | 2/1967 | Gauthier | 5/246 |
| 3,310,819 | 3/1967 | Morrison | 5/477 |
| 3,623,171 | 11/1971 | Arkin | 5/475 |
| 3,766,580 | 10/1973 | Curtis et al. | 5/265 |
| 3,777,322 | 12/1973 | Larkin | 5/267 |
| 3,789,440 | 2/1974 | Garceau | 5/256 |
| 3,795,390 | 3/1974 | Kendall et al. | 267/34 |
| 3,858,862 | 1/1975 | Ciampa et al. | 267/100 |
| 3,888,474 | 6/1975 | Mandusky et al. | 5/259.1 |
| 3,914,809 | 10/1975 | Ciampa et al. | 5/247 |
| 3,916,463 | 11/1975 | Higgins | 5/264 |
| 3,971,081 | 7/1976 | Roe | 5/246 |
| 4,004,304 | 1/1977 | Kane | 5/267 |
| 4,154,786 | 5/1979 | Plasse | 264/46.4 |
| 4,163,296 | 8/1979 | Kitchen et al. | 5/255 |
| 4,194,255 | 3/1980 | Poppe | 5/481 |
| 4,251,892 | 2/1981 | Hancock | 5/255 |
| 4,357,724 | 11/1982 | Laforest | 5/449 |
| 4,592,106 | 6/1986 | Hagemeister | 5/254 |
| 4,779,292 | 10/1988 | Dabney | 5/247 |
| 4,861,002 | 8/1989 | Dabney | 267/103 |
| 4,862,540 | 9/1989 | Savenije | 5/475 |

FOREIGN PATENT DOCUMENTS

| | | | |
|---|---|---|---|
| 271065 | 4/1965 | Australia . | |
| 0078929 | 5/1983 | European Pat. Off. | 5/246 |
| 716408 | 12/1941 | Germany | 5/246 |
| 313753 | 6/1929 | United Kingdom | 267/91 |
| 2033534 | 5/1980 | United Kingdom . | |
| 1134179 | 1/1985 | U.S.S.R. | 5/475 |
| 1134179A | 1/1985 | U.S.S.R. . | |

*Primary Examiner*—Alexander Grosz
*Attorney, Agent, or Firm*—Willian Brinks Hofer Gilson & Lione

[57] ABSTRACT

A foot member is disclosed for use in attaching a spring device to a rail for cushions, seats, or foundations for a bedding product. The foot member can straddle and snap into a frame rail, or be stapled or otherwise affixed to a frame rail.

2 Claims, 6 Drawing Sheets

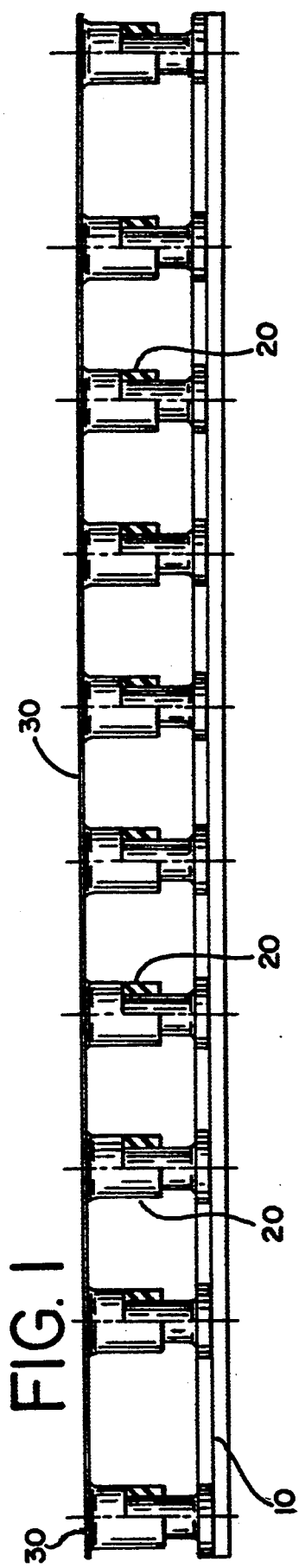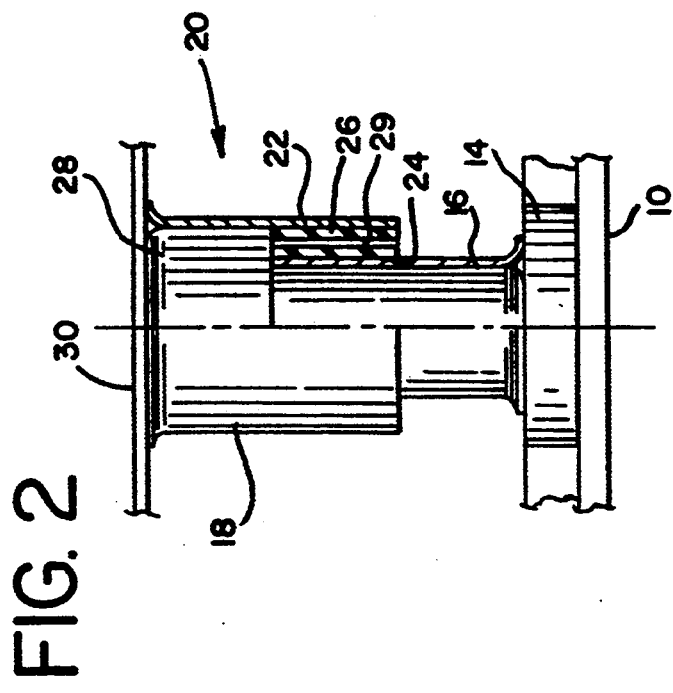

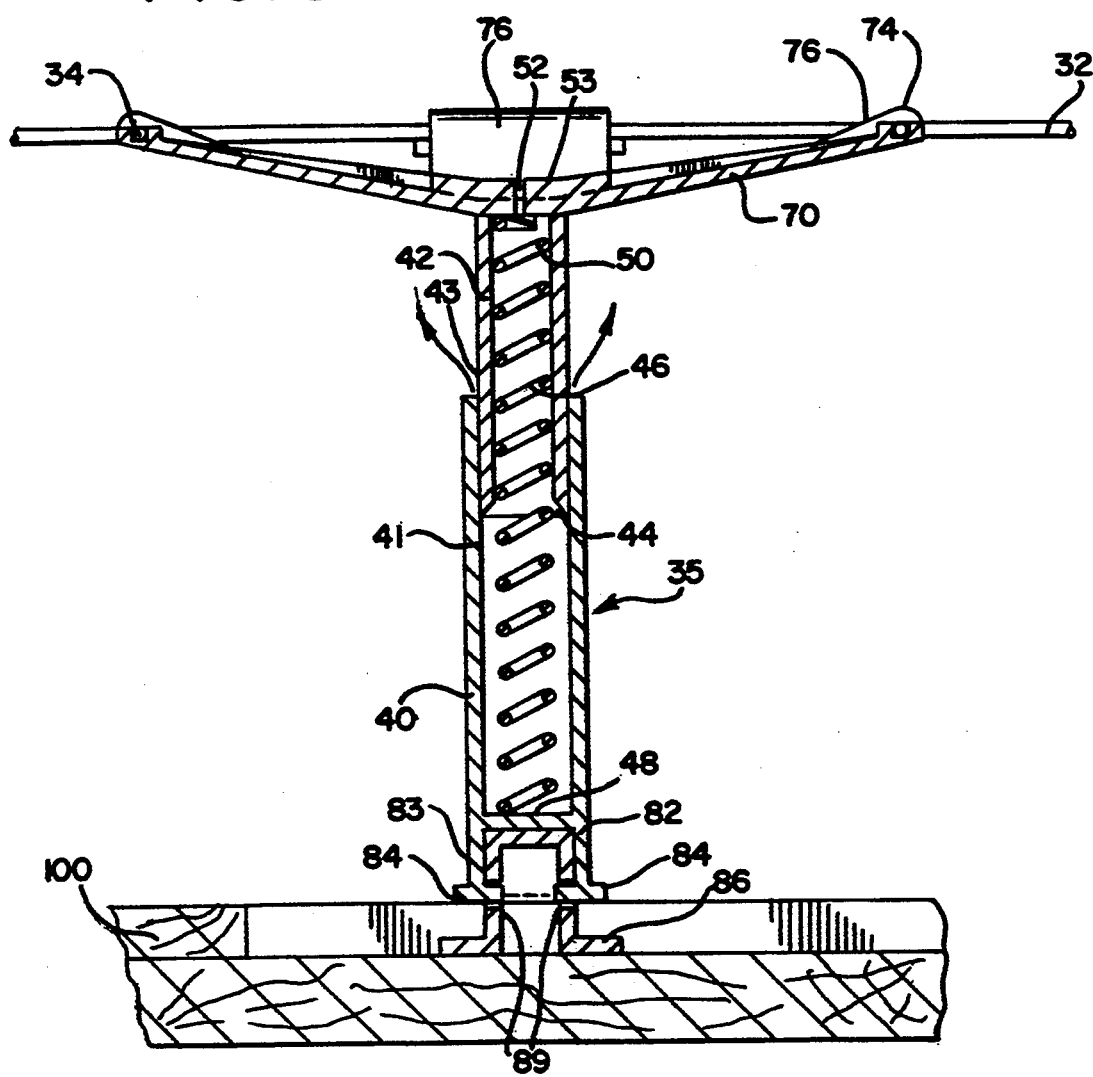

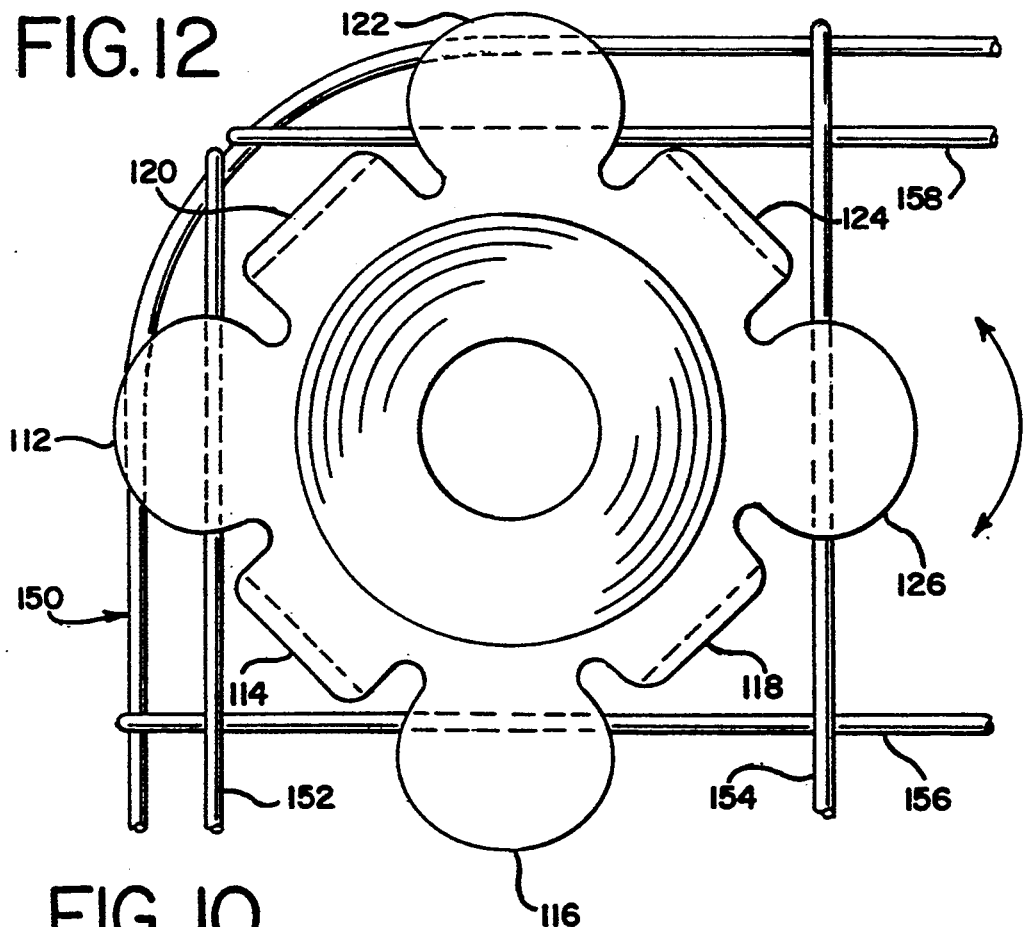
FIG. 12
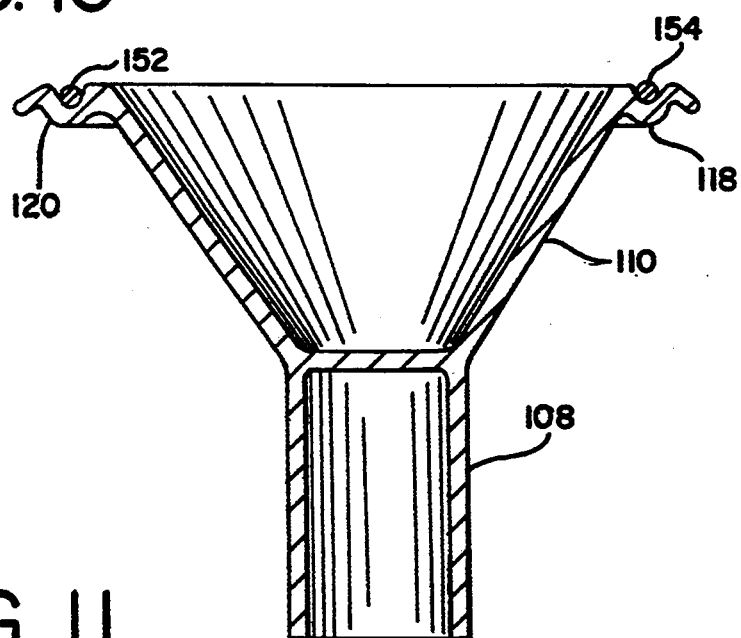
FIG. 10
FIG. 11
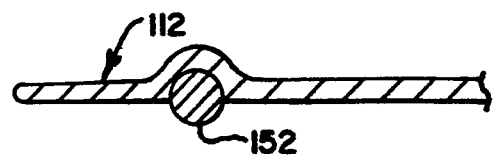

ATTACHMENT MEMBER FOR SPRING OR SPRING-LIKE ELEMENT

This application is a division of application Ser. No. 07/651,583, filed Feb. 6, 1991, now U.S. Pat. No. 5,332,202.

FIELD OF THE INVENTION

This invention relates generally to cushioning and support members for upholstered products, seats, bedding products, and the like, and more particularly to a pneumatic spring for use in such products as well as novel attachment elements for such support members.

BACKGROUND OF THE INVENTION

In its broadest sense, the present invention addresses impact absorption of a moving human body against a resisting surface. More specifically, and as related to the environment of bedding products to which the described embodiments of the invention find illustration, the movement of a body against a cushioning and supporting surface is in point.

In general terms, an impact absorbing device should arrest a moving body with minimum stress of the body and the device. One may characterize the absorption of kinetic energy in the device such that an equivalent amount may be utilized elsewhere (such as reinstating this kinetic energy back to the body at some time after impact) as an elastic impact. Alternatively an inelastic impact between the body and the device may occur, such that effectively all of the kinetic energy is dissipated by the device upon impact.

Inelastic collisions may commonly be found in many safety devices such as air bags, automobile interior panels, and crash helmets. Such devices, although effectively operating for their intended purpose, often may be used only once due to the severity of impact and the materials of construction.

Between the extremes of inelastic and elastic impacts are structures providing elastic impacts damped by some means. Structure using such damping effects may rely upon the material of the structure, structural component interactions, or the environment in which the structure is located, or some combination thereof.

In the bedding products area in which this invention finds its origin, mattress innerspring units are generally formed of a conventional plurality of spring coils arranged in side-by-side relation in parallel rows, with parallel columns also thereby being formed orthogonal to the rows. Border wires typically encircle both the upper and lower perimeters, which for purposes of further discussion, will be referred to as top and bottom perimeters respectively. Box spring foundations are also generally formed of a combination of helical or torsion springs supported by a base defined by wood side rails and end rails, with wood or steel spans extending between either the side or end rails. A wire grid or the like is typically used to form the top or support surface of the foundation. The helical or torsional springs used in the innerspring or foundation perform the impact absorption, and then support functions described.

Besides fundamental impact absorption and support, another consideration in bedding product design and manufacture is the ability to make units with different firmness characteristics suited to ranges of consumer preference. This is typically accomplished by providing several product lines having different firmness, achieved by using springs of different spring constant or by adding/removing springs; in even more sophisticated bedding products, providing areas of differing firmness in a given bedding product by mixing spring kind or count.

As may be readily recognized, producing springs of differing spring constants, ordinarily achieved by making the various springs out of different wire stock or in different configurations, results in a multiplicity of spring manufacturing processes and the necessity of stocking the different springs. While the overall layout, configuration or count may also be changed for each product firmness, this again increases the number of assembly jigs required, or at a minimum increases the complexity of product assembly.

Use of heavier wire stock, different spring fabrication machinery, more springs, or different layouts obviously adds expense to bedding product construction in terms of material and labor. A significant consideration in making bedding products with different firmness characteristics is therefore to do so in the most efficient and economical manner.

Non-wire spring bedding structures have been disclosed. One example is shown in U.S. Pat. No. 3,242,512, which discloses a resilient load supporting device consisting of a vented bellows spring cushioning assembly. In this reference, each bellows spring component is manufactured from a polymeric resilient and flexible material of rubber or the equivalent. Each such "spring" is formed not unlike the bellows of an accordion, but with a circular cross-section. The thickness of the bellows varies.

Each spring of the '512 structure functions to resist a load by collapsing along a wall circumference that is the least in thickness until fully collapsed, and then a slightly thicker wall section will collapse in a similar manner until the spring is fully collapsed. Moreover, the springs may be interleaved such that the spring ribs are in substantial contact with a neighboring spring, thereby providing additional resistance to the collapse of an individually loaded spring. Friction between ribs of the interleaved springs during loading provides a second force counteracting the compression of a loaded spring. This friction also allows for further compression of each individual rib, which reacts accordingly by expanding radially and contracting axially thereby providing a third force grounded on the compressive characteristics of the material used in spring construction. Each of the hollow springs is freely vented to the atmosphere to allow the spring to readily vent the air within the interior of the spring upon compression as well as to refill the interior of the spring upon release of a force from an impacting body. Each spring is attached to a rubber pad stretched onto the base of a load supporting structure.

Similarly, in U.S. Pat. No. 3,262,138 a vented bellows assembly is disclosed. Again, the rib bellows structures are interleaved among themselves and have venting sufficient to provide pneumatic resistance to cooperate with the control cushioning effect obtained by the interactive flexing of the bellows ribs. The springs may be secured to a load supporting structure by means of caps at either or both ends of the spring which extend through the structures.

Alternatively, an entire structure may be altered to create damping effects sufficient for a given use. Such structure is disclosed in U.S. Pat. No. 3,251,076. In this patent, an impact cushioning mat structure is disclosed with an interior modified to define individual air cells interconnected in a hexagonal or square configuration. The passage of air between cells provides an inelastic component to the elastic behavior of the material comprising the mat structure. In essence, the retained kinetic energy in the structure is just sufficient to restore the mats to their original state after an impact, thereby effectively eliminating the possibility of a rebound of the impacting body. The disclosed structure resists a load by deforming a cavity in the area of the load which dispels air to adjoining cavities via orifices or the like. The combination of the air pressure within the cavity and cavity structure consequently resist the applied load and absorb the kinetic energy of the load.

Given the state of this art, it can be seen that it would be desirable to have impact absorbing and supporting devices that have non-uniform elastic propensities, such that load supporting structures composed of individual devices may have a gradient of "spring constants" over a given area of the structure. It would also be desirable to have a single spring construction that can be readily altered to change its spring characteristics.

Moreover, there is a further need in the art for such impact absorbing devices that provide for easy installation on bases and frames of conventional load supporting structures in the bedding products industry. In this vein, it is of note that the foregoing discussion of the non-conventional spring references include structures of an unconventional composition that require altogether unconventional base supports and coverings. Efforts to develop attachment elements for both the top and bottom (i.e., the ends) of a spring which simplify assembly of the springs into the mattress, foundation, cushion, etc., are ongoing in the bedding and furniture industries.

It is therefore an objective of this invention to provide a load supporting structure which utilizes pneumatic springs, is relatively simple in construction, economical to fabricate, readily adjustable in spring characteristic, easy to assemble and install, and otherwise ideally suited to its intended purposes as a cushioning element.

SUMMARY OF THE INVENTION

The present invention comprises a pneumatic spring, as well as an assembly of such springs for use in a cushion, mattress, foundation, or the like. In one embodiment, the pneumatic spring comprises an inner sleeve and an outer sleeve which are telescoped together to form a piston cylinder. The two sleeves are joined by an elastomeric ring, which acts as a gasket and also resiliently biases the two sleeves to a rest position. An air vent is provided to the piston interior.

Alternatively, in another embodiment the inner and outer sleeves are slidably engaged with each other, with a helical spring located inside the piston formed by the sleeves, with respective ends of the spring engaging respective sleeve ends. In this latter embodiment, air within the sleeve compartment may exit through any one or combination of: (1) an aperture or apertures in the side of a respective sleeve; (2) the area where the sleeves engage; or (3) either end of a sleeve where a suitable valve, such as a flap valve, is advantageously located.

Either embodiment of the pneumatic spring will react as a shock absorber upon impact of a body. Both include a biasing element (elastomer or coil spring) which serves to also transform the pneumatic spring into a load support element. Variability in impact absorption and support force is readily available by easy adjustments to spring bias and venting rates.

As an incident to the development of the pneumatic spring of this invention, and for ease of installation to a bedding product frame, the upper terminus of the pneumatic spring has a novel attaching element that is dish-shaped, with integral wire clamps in a convenient geometry for clipping onto wires of a box spring wire grid. In another related embodiment radially extending lobes are provided on the dish which cooperate with radially extending flanges (or troughs) located between the lobes to form a snap fit attachment element for use with a wire grid. The spring element can simply be dropped into place within the grid and then rotated to snap-fit the attachment element to the grid.

In addition, a respective base sleeve may be anchored to the frame of a bedding product by feet having flanges which engage in slots formed in a cross-span, and which can alternatively be stapled to a frame span. All of the foregoing attaching elements have application beyond those of the pneumatic spring itself.

The foregoing features and advantages of this invention will be further understood upon consideration of the following detailed description of embodiments of the invention taken in conjunction with the accompanying drawings, in which:

BRIEF DESCRIPTION OF THE DRAWINGS

FIG. 1 is an elevational view, with parts in section, of an assembly for a bedding foundation made in accordance with the teachings of the invention;

FIG. 2 is an enlarged view depicting a single pneumatic spring of FIG. 1;

FIG. 3 is a cross-sectional view of another embodiment of a pneumatic spring of the present invention;

FIG. 10 is a cross-sectional view taken along line 10—10 of FIG. 8;

FIG. 11 is an enlarged cross-sectional view of an integral lobe taken along line 11—11 of FIG. 8; and FIG. 12 is a plan view of a head element with integral lobes after insertion of the spring into a wire grid, but prior to rotating for attachment to the grid.

DETAILED DESCRIPTION OF EMBODIMENTS OF THE INVENTION

Figure 4:
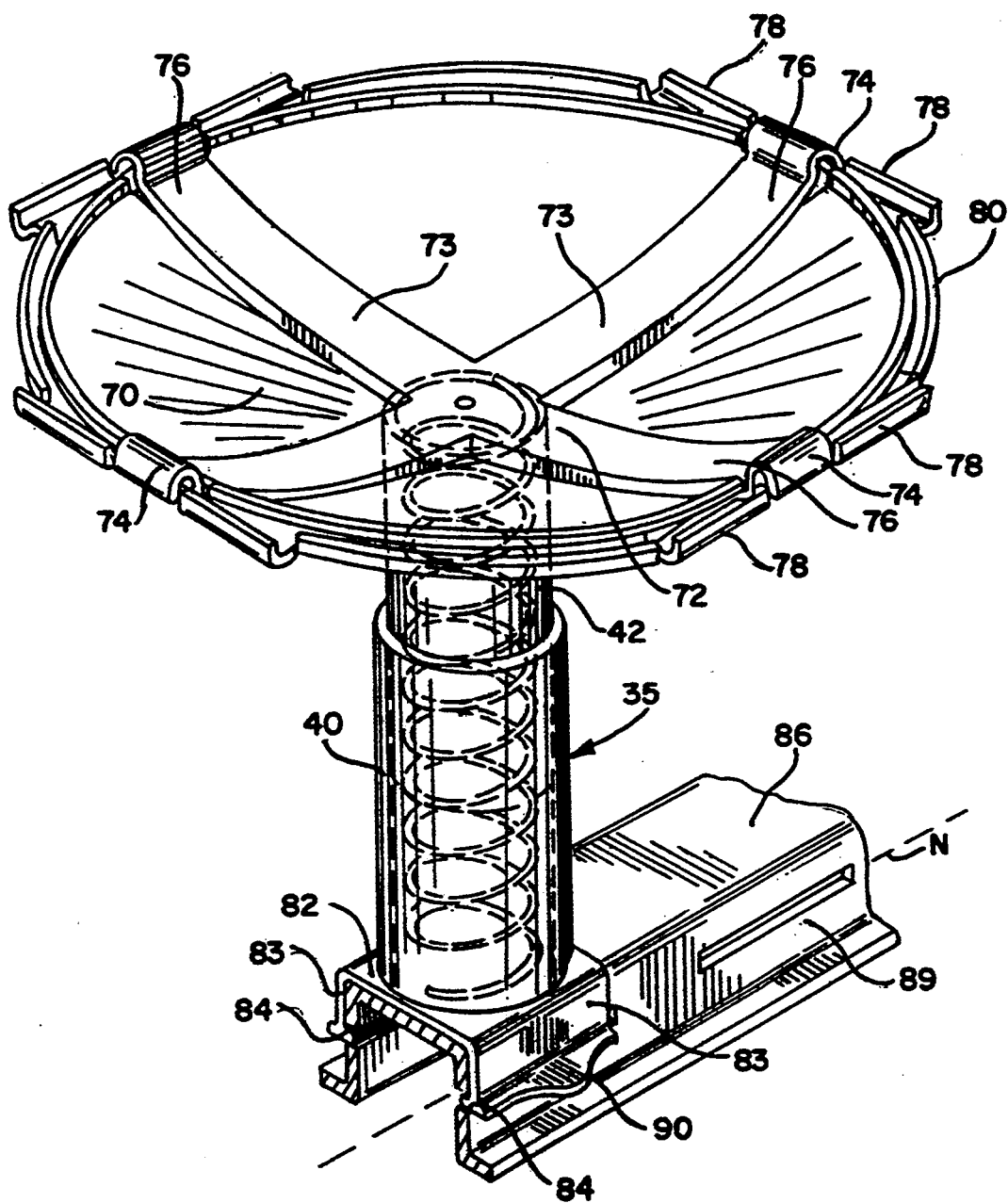
FIG. 4 is a perspective view of the pneumatic spring of FIG. 3 better illustrating the attachment elements at the ends of the spring.

The present invention is hereafter described in its application in a bedding product. It will nevertheless be understood that, although described in this particular environment, the invention is considered to have utility in other products, such as seat cushions and the like utilizing the conventional springs that this invention is designed to replace.

Referring now to the drawings, base 10 of a representative bedding product in FIG. 1—here a foundation or box spring—may be constructed in a manner similar to most bases found in a conventional foundation; i.e., with side, end and cross rails joined into a frame. A plurality of pneumatic springs 20 are mounted on the base 10. A wire grid 30 overlies the pneumatic springs 20 and forms the top surface to the foundation.

Each pneumatic spring 20 is anchored to the base 10 by any suitable means (FIG. 2), such as by stapling the widened bottom portion 14 of the spring 20 thereto. The bottom section 14 is constructed to withstand the expected compressive forces, and to also give lateral stability to the pneumatic spring.

An inner sleeve 16 extends from the bottom portion 14. Inner sleeve 16 fits within outer sleeve 18, although sleeve 16 has a much smaller diameter. It will be noted that sleeve 16 could also be a plunger, i.e., a solid member. The composition of sleeves 16 and 18 may be an inexpensive rigid plastic that is readily molded.

Outer sleeve 18 has a closed top end, as by widened top 28. Inner sleeve 16 is closed along the bottom portion 14. An air cavity is formed by the two sleeves through the placement of an elastomeric ring 26 circumferentially between sleeve 18 and element 16. Elastomer 26 may be composed of any material with sufficient elasticity, such as rubber. The elastomer ring 26 may be completely solid, or it may be discontinuous thereby providing air channels into the defined air cavity. The elastomer ring 26 is glued along its inner and outer circumferences to the respective sleeves.

So joined, sleeves 16 and 18 act as a pneumatic cylinder. An air vent or passage into the air cavity in the form of a hole 29 may be provided anywhere desired in the pneumatic spring 20, as by the use of a discontinuous elastomer ring 26 previously noted.

In normal loading of the pneumatic spring 20, sleeve 18 moves downwardly relative to sleeve 16, thereby compressing air in the air cavity and producing a resistive force related to the air chamber pressure, and the elastomeric stretching force. The resistive force of the pneumatic spring 20 can be adjusted by varying one or more of: the vent hole size; the size of the air cavity; and the elastomer, for example. It will be noted that the elastomer ring 26 is of sufficient strength to return the two sleeves 16, 18 to a rest position when the load is removed, or substantially removed. The pneumatic spring 20 mimics a coil spring in this respect.

Another embodiment of the invention is illustrated in FIGS. 3 and 4. In this embodiment, pneumatic spring 35 has an outer sleeve 40 slidably engaged with an inner sleeve 42. The cross-section of the sleeves may be of any geometry, such as oval, square, rectangular, octohedron or, as here, circular. The sleeves are made of any suitable plastic of sufficient durability and strength for the intended purpose. As in the previous embodiment, the sleeves 40, 42 are closed at bottom and top, respectively. Alternatively, sleeve 42 for instance may be in the form of a plunger, which would allow for elimination of open end 44.

The interior surface 41 of sleeve 40 is sufficiently smooth to allow for smooth slidable engagement with sleeve 42. Similarly, exterior surface 43 of sleeve 42 is of sufficient smoothness to allow for slidable engagement with sleeve 40. The sleeves may be sized to allow for slidable engagement of respective sleeves with an air gap or passage between sleeve surfaces 41 and 43 to serve as the vent previously discussed in relation to the first embodiment.

Inside of the air cavity defined by sleeves 40 and 42, and extending from interior bottom end 48 of sleeve 40 to interior top end 50 of sleeve 42, is helical spring 46. This spring may be composed of any material that has a durability and spring constant sufficient for the intended use. The spring 46 should be of sufficient length and reduced diameter to allow for proper slidable movement of one sleeve with respect to the other. Although the spring may be attached to respective interior ends 48, 50 by any appropriate means, it is preferred that the spring be loose so as not to put any torque on the sleeves under compression. It is also preferred to locate the spring inside the air cavity produced by the sleeves; locating the spring surrounding the sleeves would also be effective.

A flap valve 52 is provided at the end 50, such that the flap valve 52 is hinged to open inwardly into the air cavity formed by sleeves 40 and 42. Flap valve 52 covers an air vent 53.

Upon loading of the pneumatic spring 35, sleeve 42 will slide relative to sleeve 40, thereby producing compression of the internal air cavity defined by sleeves 40 and 42. Upon compression, flap valve 52 will seat preventing air passage, and air will exit between sleeve 40 surface 41 and sleeve 42 surface 43 in the embodiment of FIGS. 3 and 4. Spring 46 also applies resistive force opposing the loading of the sleeve assembly. Compression continues until the resistive force of the assembly equals the load force applied externally to the assembly. Upon removal of some or all of the load, spring 46 pushes sleeves 40, 42 toward their rest position, with flap valve 52 opening to allow air into the air cavity formed by the sleeves.

Figure 7:
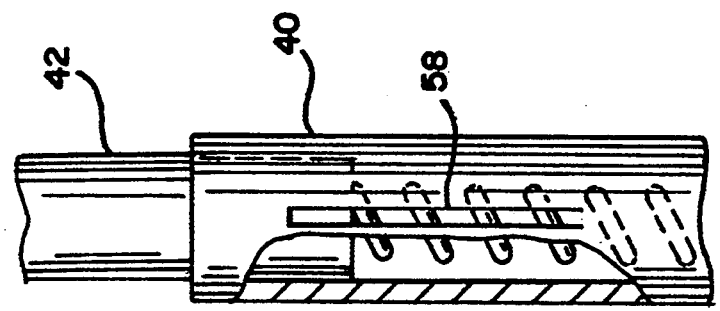
FIGS. 5-7 illustrate different orifice arrangements for the pneumatic spring of FIGS. 3 and 4.
Figure 6:
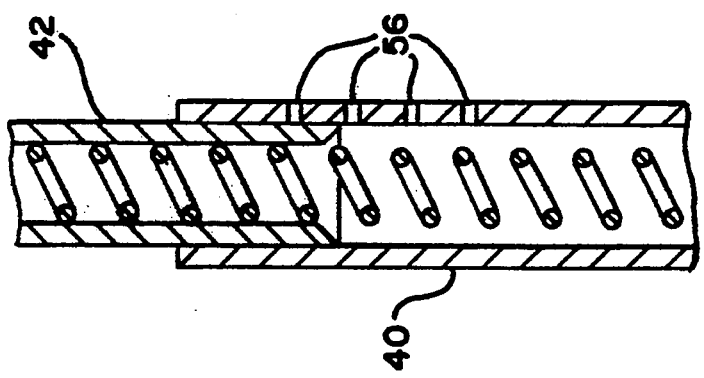
Figure 5:
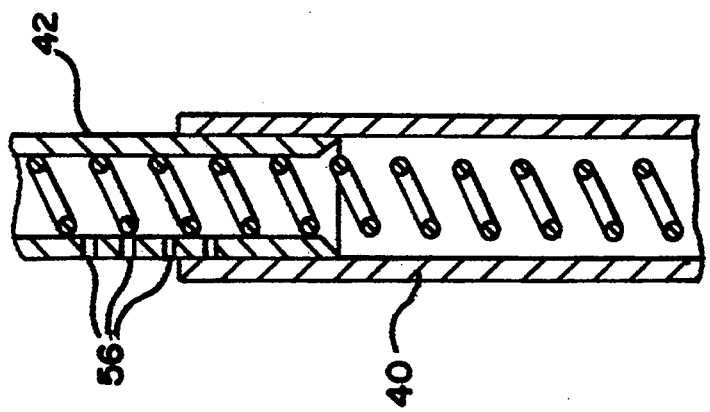

The compression resistance of the pneumatic spring 35 can be further modified through the use of various air vent shapes and combinations. For example, as shown in FIG. 5, a plurality of apertures 56 are formed in descending fashion along sleeve 42. These apertures 56 may or may not be evenly spaced along sleeve 42. As is evident, as the sleeve 42 moves within sleeve 40 under load, more vent holes are covered up, yielding an increasing rate of compression resistance. Alternatively, the vent holes 56 may be formed along sleeve 40, as shown in FIG. 6. A slot 58 could also be provided in a sleeve, as shown in FIG. 7, to the same end.

As can therefore be seen, many useful combinations and interactions between apertures and slots may be readily made to achieve the desired compression characteristics.

The upper end of sleeve 42 may be affixed to a conical element 70, best shown in FIG. 4, which in the illustrated embodiment is a shallow dish-shaped right cone. The dish 70 can be integrally molded with the sleeve 42, or fixedly mounted at its frustum 72 to the end of sleeve 42 by any suitable means. Dish 70 is provided with reinforcing ribs 73 which criss-cross the dish.

Clips 76 are formed along the edge of the dish at 90° intervals. The clips 76 can be deflected upwardly at their free ends 74, which are provided with a widened hook shape. The hook shape is adapted to grasp a crosswire 32 or 34 (FIG. 3). Clips 76 cooperate with trough member 78 formed integral with the dish edge. That is, a wire 32, 34 is received in the trough member 78, with the clip then grasping the wire. The wire is thereby clamped between clip 76 and trough 78. A reinforcing lip 80 is provided around the dish edge.

In another embodiment of the attachment element of the invention, the upper end of a spring-device sleeve 108 may also be affixed to a conical (dish-shaped) element 110, shown in FIGS. 8–12, which in the illustrated embodiment is also a right circular cone. The conical element 110 can be fixedly mounted at its frustum to the end of sleeve 108, or preferably integrally molded of the same inexpensive rigid plastic as that of sleeve 108.

A plurality of lobes and troughs (or flanges) are formed on the covered element 110 to form a rotatable snap-fit attachment mechanism. Lobe 112, for instance, extends radially outward from the axis of symmetry of conical element 110 and over long grid wire 152 and cross grid wire 156. Lobe 112 also has a pair of intersecting creases or channels formed on its underside to receive long grid wire 152 therein (FIG. 11), and/or to similarly receive cross grid wire 156, as well as receive their area of welded intersection 160.

Lobe 112 cooperates with adjacent flange or trough members 114, 120, also formed integral with conical element 110 (FIG. 10). Long grid wire 152 is received in a crease or channel formed in the top of trough member 120; cross grid wire 156 is likewise received in trough member 114. The tops of the trough members are roughly co-planar with the underside of the lobe 112. The wires are thereby clamped between lobe 112 and respective troughs.

Figure 8:
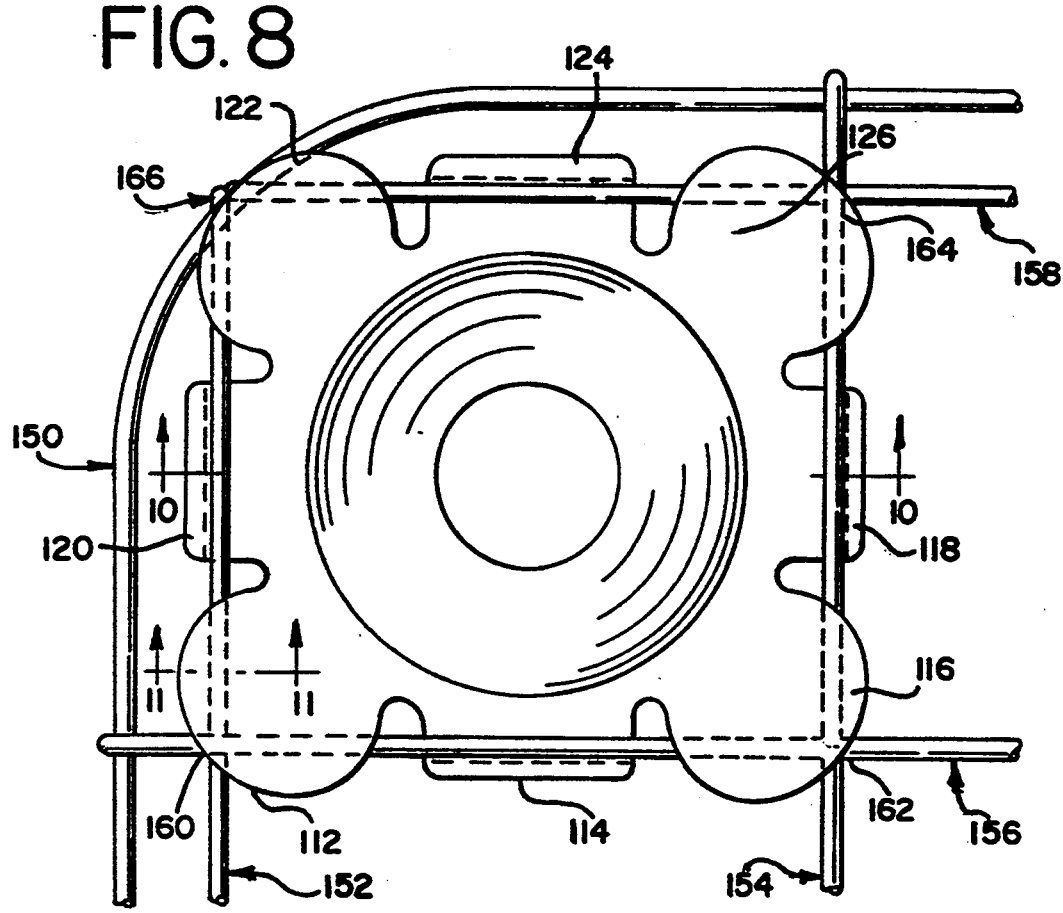
FIG. 8 is a plan view of a head element with integral lobes.
Figure 9:
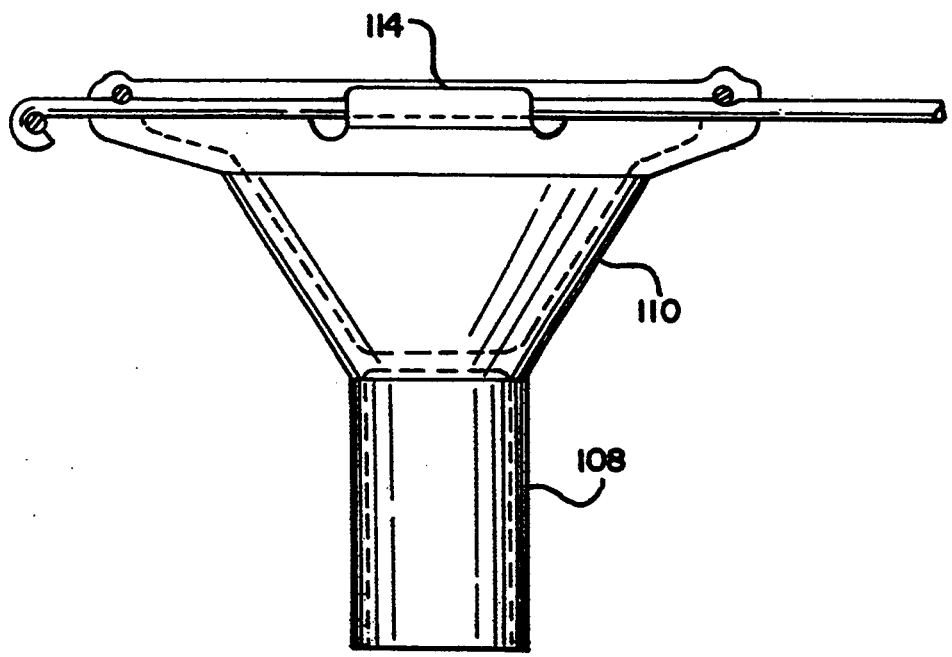
FIG. 9 is an elevational view of the head element of FIG. 8.

Similar interactions are found between: lobe 126 and trough members 124, 118 with cross grid wire 158, long grid wire 154, and welded intersection 164; lobe 122 and trough members 124, 120 with cross grid wire 158, long grid wire 152, border wire 150, and welded intersection 166; and lobe 116 and trough members 114, 118 with cross grid wire 156, long grid wire 154, and welded intersection 162. While one lobe and trough pair might be used to hold a spring device in place, four symmetrically spaced pairs are presently preferred (FIG. 8). This lobed head element is obviously applicable to a wire grid defining other rectangular openings beyond square.

Significantly, this head element may be readily installed in a conventual grid by dropping a spring with head element into a grid, as shown in FIG. 12. Lobes 112, 116, 126, 122 contact wires 152, 156, 154, 158 respectively, and trough members 114, 118, 124, 120 are clear of their respective wires. Upon substantial contact of the lobes with respective wires, a snap-lock fit attachment of the element to the grid is readily obtained by rotating the head element 45° (one-eighth turn) to engage the lobes over the respective wires and the trough members under the respective wires. The edges of the trough members and lobes receiving the respective wires are contoured to allow rotation of the head element in either angular direction (clockwise or counterclockwise) without undue resistance to a proper snap-fit attachment. The grid wires serve to pry the lobes and troughs apart to pass over opposite sides of the wires, and into a position where the wires slip into respective channels, thus fixing the attachment elements—and thereby the spring—in place on the grid.

The bottom end 48 of sleeve 40 has a foot 82, best shown in FIG. 4, formed integral therewith. The foot 82 has depending sides 83 extending parallel to a longitudinal axis defined by the sleeves 40 and 42. The sides 83 are spaced apart sufficiently to straddle a steel span 86.

Perpendicular to sides 83 and extending outwardly away from the axis are tabs 90, suitable for use in attaching the foot 82 to a flat surface in the event that the foot 82 is to be mounted on top of a wood rail 100 (FIG. 3), for example. A nail, staple or the like would be driven through the tab 90 to fix it in place.

Opposite of tabs 90 on sides 83, but in the same plane, are flanges 84 extending inwardly toward the longitudinal axis previously defined. Flanges 84 are designed to be inserted into slots 89 in the steel span 86. The foot can thus be simply mounted in a clip-on fashion. The bottom 48 of sleeve 40 (i.e., the top of the foot 82) preferably rests on the top of the span 86. As can be seen, foot 82 has universal application to a wood side rail 100 or to span 86, thereby promoting the utility of the assembly for any frame.

Span 86 has a neutral axis N, shown in dotted line, where bending and torsional forces on the web are approximately equal when the span 86 is under load. The slots 89 are formed along the neutral axis in sufficient frequency and position to allow for optimizing various applications of the pneumatic spring 35, while maintaining the structural integrity of span 86.

Thus, while the invention has been described with reference to particular embodiments, modifications of structure, materials and the like will be apparent to those skilled in the art, yet still fall within the scope of the invention.

What is claimed is:

1. A mount for a spring-device used in bedding and cushions, comprising:
 a foot member formed on an end of a spring-device member for attachment to a frame, said foot member comprising a base from which depend a pair of opposed sides, said sides each having a flange extending inboard toward one another, said flanges being adapted to be received in slots formed in a rail which is part of said frame, with said foot base resting on the rail when said flanges are so received in the slots, and an ear formed on each of said depending sides and extending outboard, said ears being adapted to receive a staple or other attachment means to fix said ear to a frame rail as an alternative to use of said flanges.

2. A mount for a spring-device used in bedding and cushions, comprising:
 a foot member for attachment to a frame, said foot member comprising a base from which depend a pair of opposed sides, at least one of said depending sides having a flange extending inboard, said flange being adapted to be received in one of a plurality of slots formed in a rail which is part of said frame, with said foot member base resting on the rail when said flange is so received in the slot, and an ear formed on at least one of said depending sides and extending outboard, said ear being adapted to receive a staple or other attachment means to fix said ear to a frame rail.

* * * * *